United States Patent
Griffioen et al.

[11] Patent Number: 6,089,546
[45] Date of Patent: Jul. 18, 2000

[54] APPARATUS AND METHOD FOR REMOVING CABLES FROM TUBES

[75] Inventors: Willem Griffioen, Ter Aar; Hendrik Antonius Bäcker, Dordrecht, both of Netherlands

[73] Assignee: Koninklijke KPN N.V., Groningen, Netherlands

[21] Appl. No.: 08/898,970

[22] Filed: Jul. 23, 1997

[30] Foreign Application Priority Data

Jul. 25, 1996 [NL] Netherlands ............................ 1003681

[51] Int. Cl.$^7$ ...................................................... H02G 1/00
[52] U.S. Cl. .................. 254/134.4; 254/134.3 R
[58] Field of Search ....................... 254/134.4, 134.3 FT, 254/134.3 R

[56] References Cited

U.S. PATENT DOCUMENTS

| | | | |
|---|---|---|---|
| 5,143,353 | 9/1992 | Sano et al. | 254/134.4 |
| 5,456,450 | 10/1995 | Reeve et al. | 254/134.4 |
| 5,699,996 | 12/1997 | Boyle et al. | 254/134.4 |
| 5,732,934 | 3/1998 | Sano et al. | 254/134.4 |
| 5,762,321 | 6/1998 | Petersen et al. | 254/134.4 |
| 5,813,658 | 9/1998 | Kaminski et al. | 254/134.4 |

FOREIGN PATENT DOCUMENTS

| | | |
|---|---|---|
| 677707 | 6/1991 | Switzerland . |
| 2 085 670 | 4/1982 | United Kingdom . |
| 2 152 621 | 8/1985 | United Kingdom . |

OTHER PUBLICATIONS

Patent Abstracts of Japan vol. 10, No. 119 & JP 60 247203 (Fujikura Densen KK), Dec. 1985.
Patent Abstracts of Japan vol. 96, No. 6 & JP 07 154910 (Dawe John Edmund) Aug. 1985.

*Primary Examiner*—David A. Scherbel
*Assistant Examiner*—Lee Wilson
*Attorney, Agent, or Firm*—Frishauf, Holtz, Goodman, Langer & Chick, P.C.

[57] ABSTRACT

For removing cables from tubes, the invention provides a method wherein a cable is sucked from a tube, by connecting an evacuating pump to a cable lead-through apparatus one end of which is connected to the tube and the other end of which is provided with a lead-out opening for the free end of the cable. In one embodiment, the final portion of the cable is removed from the tube by connecting a compressor to the same cable lead-through apparatus. The invention also provides an apparatus for removing cables through suction force, wherein, in one embodiment, the same apparatus can also be used for installing cables in a tube through blowing.

13 Claims, 3 Drawing Sheets

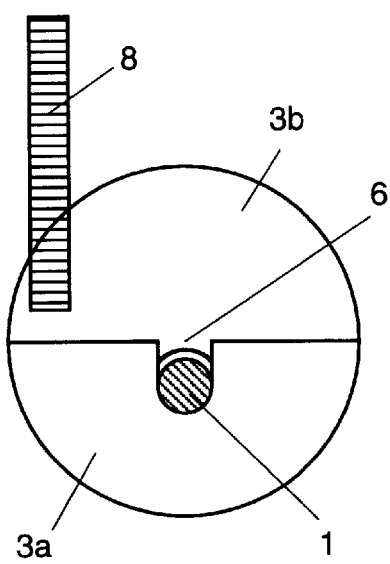
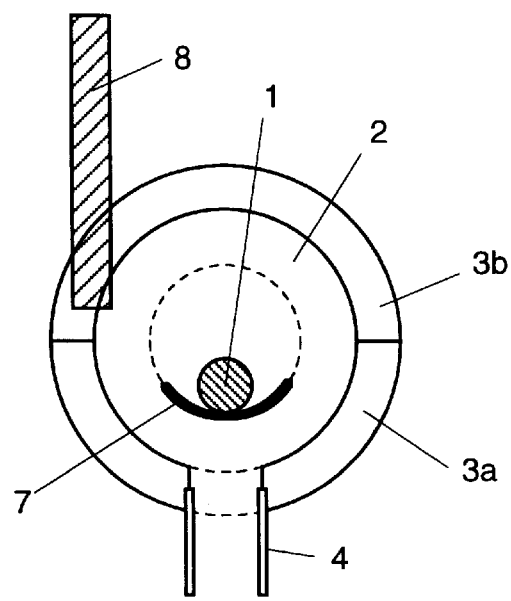
FIG. 1B  FIG. 1C
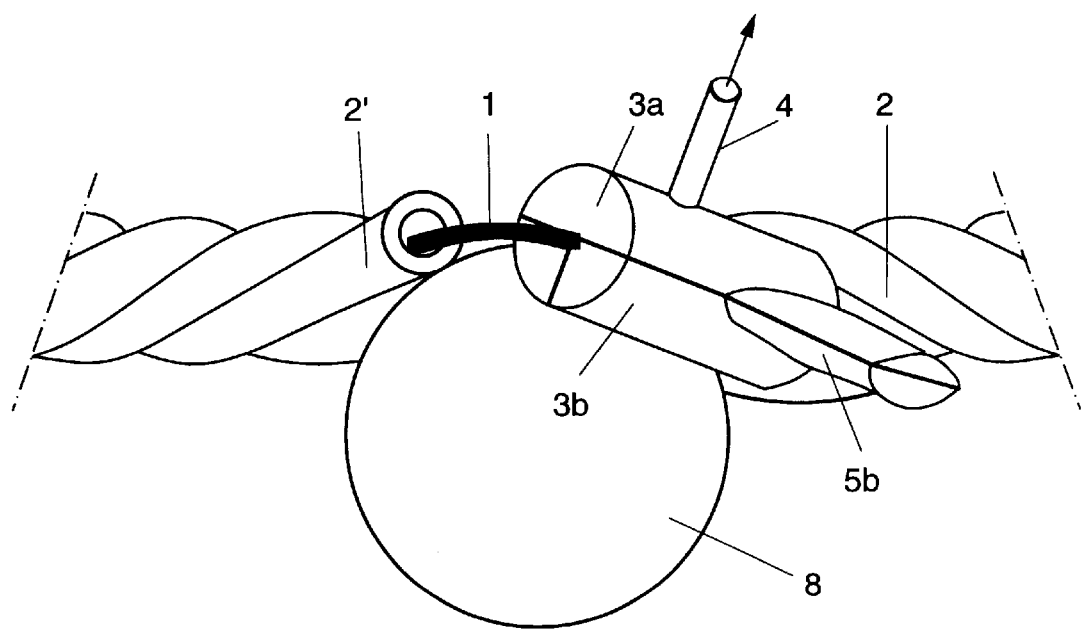
FIG. 2

APPARATUS AND METHOD FOR REMOVING CABLES FROM TUBES

FIELD OF THE INVENTION

The invention relates to an apparatus and a method for removing cables from tubes by means of a moving fluid.

BACKGROUND OF THE INVENTION

For installing cables, in particular optical cables or optical fibers, in tubes, various techniques are known. The oldest and best-known technique is pulling the cable through the tube. This involves a reel with cable being disposed at the insertion end of a tube and the cable being pulled through the tube by means of a pulling wire priorly provided in the tube. This technique has as a drawback inter alia that the pulling forces required for overcoming the friction of the cable over the often winding tubular path are very high and, in particular with optical fibers or optical cables, can exceed the allowable value.

EP-A-0 108 590 describes a technique for installing optical fibers of a slight diameter in a tube by means of a fluid under pressure. For this purpose, a blowing unit is disposed at the insertion end of the tube. After the leading end of the fiber has been inserted into the tube, the blowing force is sufficient for moving the fiber through the tube.

EP-A-0 292 037 describes an adaptation of this known technique for optical cables having an intrinsic stiffness, with the insertion being effected through a combination of pushing and blowing.

It is also known to install cables in tubes by exerting a suction force on the tube end located opposite the insertion end of the tube and thus suck the cable into the tube. Examples hereof can be found in CH-B-677707, EP-A-0 319 194 and in GB-A-2.152.621, which last-mentioned publication describes an element provided at the insertion end of the cable, which element substantially fills up the tube diameter and enables a more efficient insertion through the prevention of leakage.

None of the above-cited publications mentions anything at all about the problem that it is sometimes desired to remove a cable that is already installed from the tube again. This problem is in fact described in EP-A-0 428 830 and in DE-C-39 37 695.

EP-A-0 428 830 also describes a technique for installing optical fibers or cables in tubes by means of blowing force. The cable to be blown into a tube is included in a storage tube that can be wound up so as to be coil-shaped. One end of the storage tube is connected to the installation tube in which the cable is to be installed, and the other end is connected to a compressor whereby the cable is blown from the storage tube into the installation tube. As an advantage of this technique it is mentioned that the compressor need not be disposed close to the inlet end of the installation tube, and that the cable need not be introduced mechanically into a pressure space. This publication also describes that by means of the compressor it is possible to remove a cable from the installation tube by means of blowing force, for which purpose the compressor is connected to the end of that tube other than the end to which the storage tube is coupled, and the cable is blown out of the installation tube into the storage tube. However, the use of a storage tube has drawbacks in view of the room required therefor and the limited cable length that can be included therein. When a cable is being removed from an installation tube, it is also a drawback that the compressor and the storage tube are located in different places, each at one end of the installation tube, so that two operators are required. Further, for instance during the removal of cables from a star-shaped network, either the compressor or the storage tube should each time be displaced to another end of the star.

DE-C-39 37 695 describes a cable having several optical fibers, which fibers are provided in separate ducts in the cable in such a manner that when the cable is partially cut through and a duct is opened, the fiber present therein can be pulled from the end of the cable remote from the exchange and be used for a house connection. In this manner, from a cable, a large number of branches can be realized at different distances from the exchange. This publication mentions the problem that pulling the fiber from the cable may present problems if the length to be pulled out is great. For that reason, a cable is used wherein the length of twist of the fibers is 0.6–8 m and preferably 5–6 m, i.e. much longer than is usual and desired, and it is further proposed in this publication to lay the fibers in a gel-like substance or to shorten the fibers already in advance. The first proposal increases the cost price, which also holds for the second proposal, which second proposal has the additional drawback that the flexibility for choosing the locations of the branches is restrained already in advance.

OBJECT OF THE INVENTION

The object of the invention is to provide a method for removing cables from tubes which does not have the above-mentioned drawbacks.

To this end, the invention provides a method for removing cables from tubes by means of a moving fluid, characterized in that to one end of a tube in which a cable to be removed is present, a suction force is applied by means of an evacuating pump that is connected to a cable leadthrough apparatus coupled at one end thereof to the end of the tube and provided at the opposite end thereof with a lead-out opening through which the free end of the cable is passed.

SUMMARY OF THE INVENTION

According to a further embodiment of the invention, when the cable in the tube comes to a stop after the larger portion thereof has been removed from the tube, the remaining portion is removed from the tube through blowing by means of a compressor instead of sucking.

The invention also provides an apparatus for removing cables from tubes by means of a moving fluid, characterized by a substantially airtight housing having a connecting opening for a tube in which a cable is present, a lead-out opening for the cable located opposite the connecting opening, and means for connecting an evacuating pump.

It is observed that U.S. Pat. No. 5,174,684 discloses a method for removing a copper cable from a tube, wherein the tube is closed at one end and an evacuating pump is connected to the other end. The creation of a vacuum in the interior of the tube causes the copper cable to "implode" and fill the tube to a slighter degree. After this, the cable is removed from the tube in a conventional manner by means of pulling.

Hereinafter, the invention and the underlying calculations will be specified with reference to the accompanying drawings. In these drawings:

BRIEF DESCRIPTION OF THE DRAWINGS

FIG. 1B is a front view of the apparatus according to FIG. 1A;

FIG. 1c is a section along the line IIC—IIC in FIG. 1A;

FIG. 2 shows a segment of a cable in which a branch is to be made, utilizing the apparatus according to FIG. 1;

DETAILED DESCRIPTION

Figure 1A:
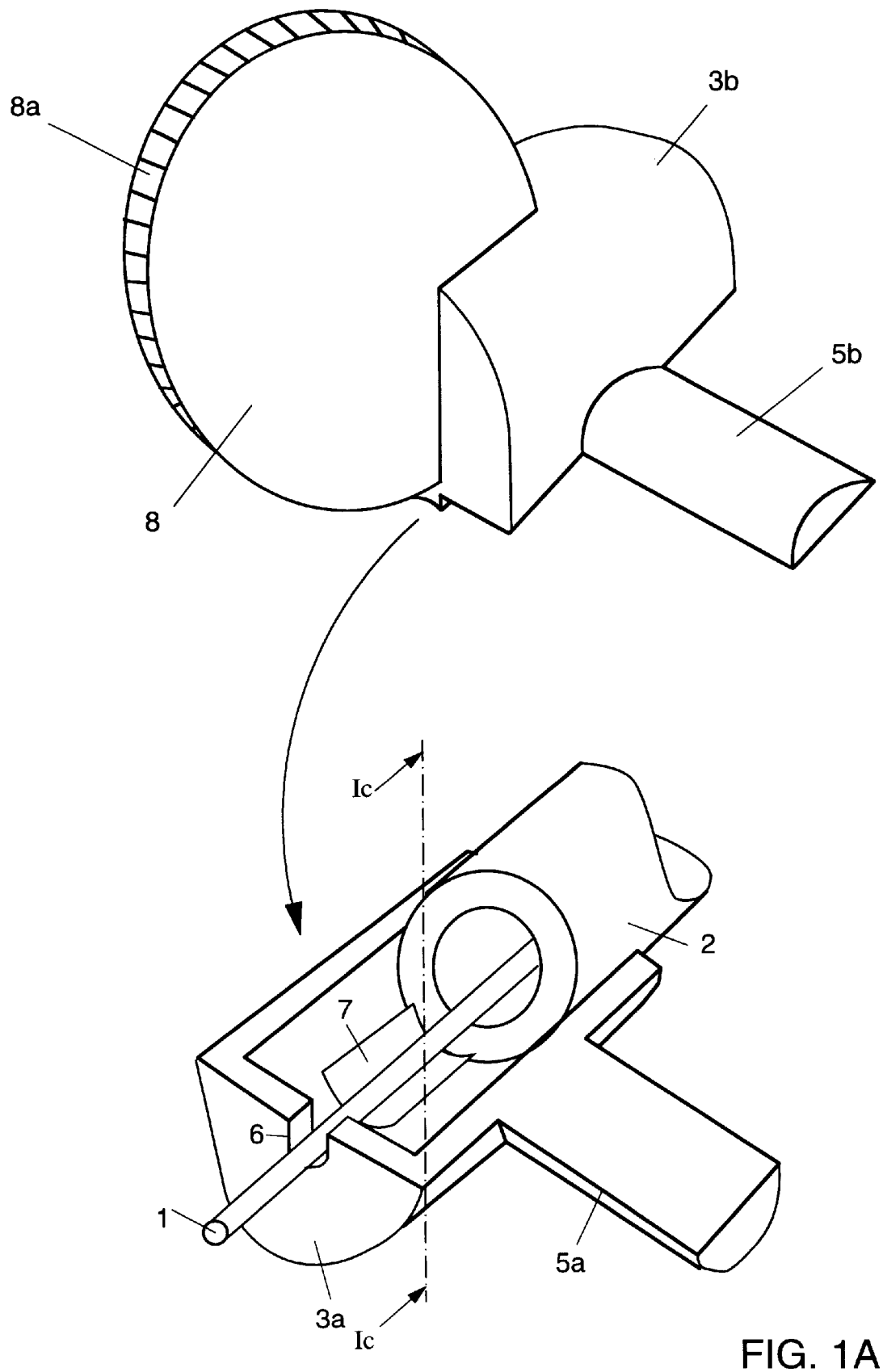
FIG. 1A shows, in perspective, a first exemplary embodiment of the apparatus according to the invention.

Below, the principle of removing a cable from a tube by means of suction force, possibly in combination with blowing force, will be explained first.

The formulae used hereinafter can largely be found in the book "Installation of optical cables in ducts" by W. Griffioen, Plumettaz, Bex (CH), henceforth referred to as D1.

On a cable having diameter $D_c$ that is moved in a tube having an internal diameter $D_d$, a force dF is exerted by an air flow (see D1, page 68, formula 5.6):

$$dF = \frac{\pi D_c D_d}{4} dp \quad (1)$$

In this formula, dp is the pressure gradient. The pressure change is not linear. For a pressure $p_0$ at the cable lead-through, the location where the cable leaves the tube, and a pressure $p_1$ at the other, open, end of the tube having length 1, the following applies to the pressure $p_x$ at distance x from the cable lead-through (see D1, page 70, formula 5.10):

$$p_x = \sqrt{p_0^2 - (p_0^2 - p_1^2)x/l} \quad (2)$$

If, owing to the maintenance of the pressure gradient, a pressure difference $\Delta p$ is present over the cable lead-through, the cable will here, too, experience a (local) force $\Delta F$ (see D1, page 66, formula 5.1):

$$\Delta F = \frac{\pi D_c^2}{4} \Delta p \quad (3)$$

If an atmospheric pressure $p_a$ prevails outside the tube and pumping takes place at the cable lead-through, $p_0 = 0$ and $p_1 = P_a$, hence $\Delta p$ equals $p_a$. When a length x of cable is still present in the tube, there occurs a situation in which the total suction forces over the cable length that is still present equals the local force $\Delta F$ at the cable lead-through. However, for this balance, the difference between the pressure $p_x$ at the cable end and the pressure $p_a$ outside the lead-through should be considered, rather than the pressure difference at the location of the cable lead-through (see U.S. Pat. No. 4,948,097). From (1) and (3), it is then found that, with $\Delta p = p_a - p_x$, this balance occurs if it applies that:

$$\frac{\pi D_c^2}{4}(p_a - p_x) = \frac{\pi D_c D_d}{4} p_x \quad (4)$$

Hence, for a pressure $p_x$:

$$p_x = p_a \frac{D_c}{D_c + D_d} \quad (5)$$

Accordingly, with (2) the location x of the cable end is found for which this occurs:

$$\frac{x}{l} = \frac{D_c^2}{(D_c + D_d)^2} \quad (6)$$

When $D_d$ is for instance three times as great as $D_c$, the balance is only at one-sixteenth of the tube length. For this last portion, the cable can optionally be removed by hand, but according to a further aspect of the invention, the removal can be effected in a much more elegant manner, without for instance hand power or a motor. In this connection, the invention is based upon the insight that if, when the cable is being extracted from the tube through suction, the cable end comes to rest at the above-found point x, and an excess pressure $p_0$ is subsequently applied to the tube, the cable is blown further out of the tube if at least this point x lies less far in the tube than the point x that can be calculated for blowing out. This point follows (for $p_0 \neq p_a$) analogously with the derivation from (6):

$$\frac{x}{l} = \frac{D_c^2 + 2D_c D_d p_0/(p_0 + p_a)}{(D_c + D_d)^2} \quad (7)$$

This point always lies further in the tube than the point from (6). When $D_d$ is for instance three times as great as $D_c$, and the pressure $p_0$ equals 9 bars (absolute), the balance is at forty percent of the tube length. This means that a cable can be removed from the tube in rearward direction without a motor by first applying suction at the cable lead-through and subsequently pressurizing the tube again. The above equation is only meaningful if the friction forces are negligible. This is usually the case if the cable is in the tube for only a sixteenth portion of the length thereof.

From (6) it follows that the point x is closer to the cable lead-through if $D_c/D_d$ is smaller. Hence, the smaller $D_c/D_d$, the smaller the error made through the assumption that no friction occurs that disturbs the balance from (6). Accordingly, in the case of cables that fit closely in the tube, a considerable error could occur in the calculation.

However, through calculations, it can be demonstrated that in principle, a correction of the extent to which the cable fills the tube is not necessary, because without correction the "worst-case value" is found. The reason why no correction is necessary is that in a tube largely filled with cable, the flow resistance of the air increases, which has a favorable influence on the distance through which the cable is sucked from the tube before it comes to a stop.

The invention is applicable to cables of a slight diameter as well as cables of a large diameter. The removal of cables of a slight diameter by means of a suction technique offers advantages in particular in the case of star-shaped or bus-shaped cable networks, terminating in, for instance, houses. To prevent suction equipment from having to be displaced all the time, the suction preferably takes place from the center of the star network or from the point of a bus network closest to the exchange.

Another extremely useful application of the suction technique pertains to installing glass fiber networks as far as the subscriber connection without requiring welds in the glass fiber. In conventional connection networks for cable television and telecommunication, the final portion of the network, located closest to the subscriber, still consists of copper cable and branches are made by means of welding, which can be realized in a very simple manner and without technical difficulties. When in the future the final portion of the networks is provided with glass fiber cable as well, which, in view of the much greater transmission capacity thereof is highly desirable, the problem arises that welds are much more difficult to make in glass fiber cables than in copper cable and are definitely much more expensive. Hence, there is a need for a technique which enables glass fiber cables to be laid without welds as far as the subscriber. For this purpose, it is already known, for instance from DE-C-3,937,695, to install a bundle of small tubes or ducts, each duct or tube containing a glass fiber, and, at the location of the desired branch, to cut through one tube or open one duct and pull the upstream portion of the glass fiber present therein from the tube and install it via another tube, for instance by means of a blowing technique, as far as the subscriber. When using such bundles with tubes or ducts, pulling back the glass fibers is often troublesome because of the twist in which the tubes are preferably cabled, which, during pulling back, may involve an exponential and unduly high build-up of forces, which is undesirable for the glass fiber. For that reason, in the known bundles with tubes or ducts, the twist is often chosen to be long, which, however, is disadvantageous in respect of the bending behavior of the cable. By means of the suction technique according to the invention, such exponential build-up of forces does not occur and hence, a smaller length of twist is possible.

FIGS. 1A–1C shows an apparatus suitable for sucking cables 1 from a tube 2. The apparatus comprises a substantially cylindrical housing 3 consisting of two shell halves 3*a* and 3*b* that can be attached to each other so as to be substantially air-tight. Provided at one longitudinal end of the housing is an opening for receiving the free end of the tube 2 containing the cable 1. The opposite longitudinal end of the housing 3 comprises an end wall having a passage opening 6 for the cable 1. Provided at the bottom side of the shell half 3*a* is a bush 4 for connecting an evacuating pump. To prevent the cable from being sucked into the connecting bush 4, there is provided a guide partition 7, arranged between the cable and the connecting bush. If so desired, the housing may comprise a hand grip 5 whose parts 5*a* and 5*b* respectively form part of the shell halves 3*a* and 3*b*. By pressing the hand grip portions 5*a* and 5*b* together, the housing is sealed so as to be sufficiently air-tight, while obviously, rubber sections or the like may further be included in the faces, abutting against each other, of the shell halves 3*a* and 3*b* for further improvement of the sealing. On the other hand, it is also possible to provide fastening means, such as clamps or the like, for pressing the shell halves together, while the hand grip 5 could be omitted. When the apparatus according to FIGS. 1A–1C is used for sucking out a fiber from a tube forming part of a bundle of tubes, there is preferably provided a guide disk 8 having a guide groove 8*a*.

FIG. 2 shows the apparatus according to FIGS. 1A–1C with the guide disk 8 when used for a bundle of twist-cabled tubes that each comprise a glass fiber. By guiding the tube 2, 2' to be cut through over the groove 8*a* of the disk 8, the bending radius of the fiber 1' is prevented from becoming too small, which could cause damage to the glass fiber. When a vacuum is applied to the connecting bush 4 and the disk 8 with the apparatus 3 is moved slightly upwards, the fiber 1' with the part extending in the tube portion 2 will be sucked from that tube portion, after which it can be passed, via another tube, as far as the subscriber.

The apparatus according to FIGS. 1A–1C can also be used for cables of a larger diameter, while for removing the final portion of the cable, if one cannot or does not wish to pull it from the tube, a compressor can be connected to the connecting bush 4.

Figure 3:
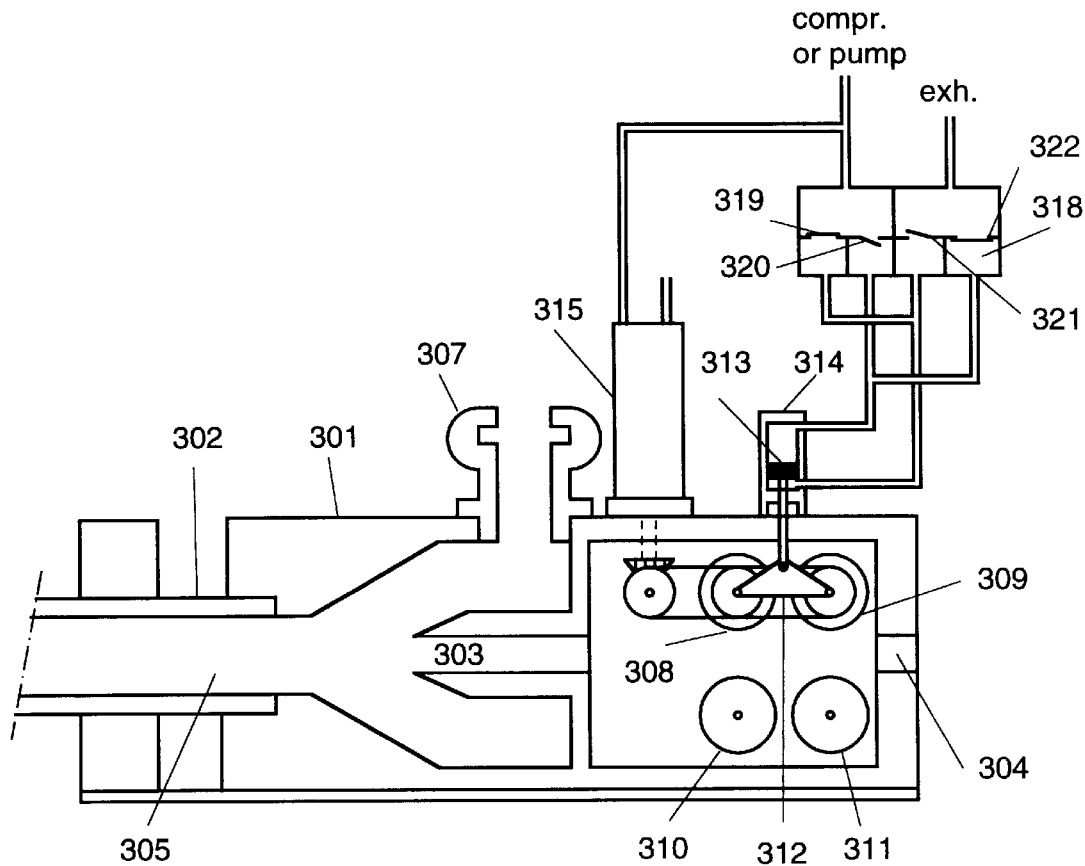
FIG. 3 is a second exemplary embodiment of an apparatus according to the invention, in cross section.
Figure 4:
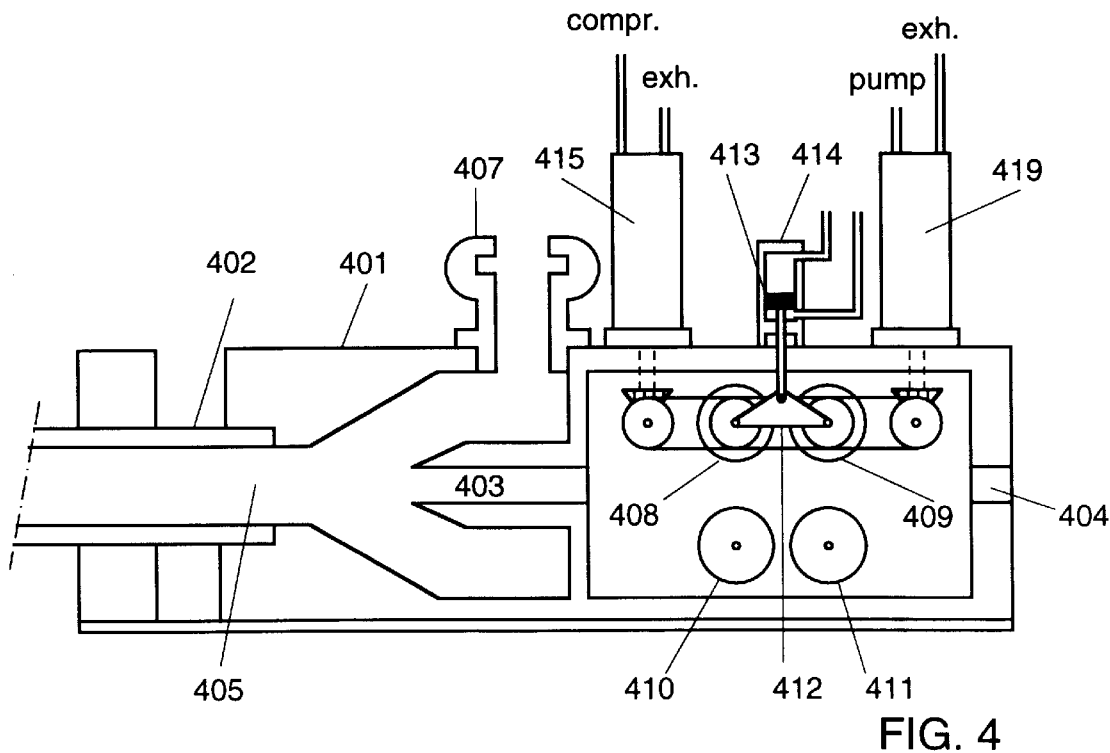
FIG. 4 is a third exemplary embodiment of an apparatus according to the invention.

For cables of a greater diameter, the apparatuses shown in FIGS. 3 and 4 can also be used advantageously. The advantage of sucking out larger cables is that the apparatus for removing the cable is positioned at the location where the cable leaves the tube, as opposed to the situation where a cable is completely blown from a tube. Indeed, it can then be provided that the cable does not leave the tube in an uncontrolled manner and may cause damage or end up in undesired places, which could for instance happen to cables laid along motorways.

The apparatuses according to FIGS. 3 and 4 bear great resemblance to the apparatus for blowing in cables shown in EP-A-0 292 037. Hence, the apparatuses according to FIGS. 3 and 4 can in principle be used not merely for sucking out a cable, but also for blowing in cables. In FIGS. 3 and 4, identical parts are designated by identical reference numerals, but preceded by 3(0) or 4(0) respectively.

FIGS. 3 and 4 show a housing 301, 401 that can be connected, at one side thereof, to a tube 302, 402 from which a cable is to be removed or into which a cable is to be introduced. In the housing, a substantially rectilinear cable lead-through duct 303, 403 is formed, having a lead-through 304, 404 through which a cable can be guided, and a connection 305, 405 that can be coupled in a gas-tight manner to a tube 302, 402. At suitable locations, the cable lead-through duct is provided with sealings to prevent the occurrence of air leakage to or from the surroundings. An inlet tube 307, 407 terminates at the lead-through duct 303, 403, and can for sucking out be connected to an evacuating pump, not shown, and for blowing in to a compressor, not shown either. A set of wheels 308, 309, 310 and 311, respectively 408, 409, 410 and 411 is rotatably mounted in the housing and partly extends into the lead-through duct 303, 403. The set of wheels 308 and 309, respectively 408, 409 is supported by a frame 312 respectively 412 which is rotatably coupled to a piston rod of a piston 313 respectively 413 movably fitted in a pneumatic cylinder 314 respectively 414. As shown schematically in FIGS. 3 and 4, the wheels 308 and 309 respectively 408 and 409 can be rotated via a transmission mechanism by means of a pneumatic motor 315 respectively 415 or 419 mounted on the housing.

In the apparatus according to FIG. 3, a piston 313 in the pneumatic cylinder is energized via a pneumatic switch 318 consisting of valves 319, 320, 321 and 322. To the portion of the pneumatic switch 318 containing the valves 319 and 320, a pump or a compressor can be connected. The portion with the valves 321 and 322 forms a discharge for air. In the case of suction, the valves 320 and 321 are closed and the valves 319 and 322 are open, and a reduced pressure is created at the bottom side of the piston, causing the piston to press the wheels 308 and 309 against the opposite wheels 310 and 311. The pneumatic motor 315 is likewise driven by the suction force and drives the wheels 308 and/or 309 in such a manner that they support the effect of the suction force applied to the connection 307 for displacing the cable from the tube. In the case where a cable is blown into a tube, the valves 320 and 321 are open and the valves 319 and 322 are closed. Now, the piston is pressed downwards by the excess pressure on the top side thereof and the unit 301 act. in the manner described in EP-A-0 292 037. The motor 315 is now driven by excess pressure and rotates in the direction opposite to that involved in sucking.

If it is desired to use different motors for sucking and blowing a cable, the apparatus according to FIG. 4 can be used, wherein a second pneumatic motor 419 is provided, driven by means of suction force. Each of the motors 415 and 419 drives both wheels 408 and 409, while the drive of the non-active motor is disengaged. The operation of the pneumatic cylinder 414 with the piston 413 is the same as described in respect of the apparatus according to FIG. 3, while also the same pneumatic switch is present, although not shown. Pneumatic switching can also take place between the motor 415 during blowing in and the motor 419 during sucking out. If one only wishes to suck a cable from the tube, the apparatus described in FIG. 3 of EP-A-0 292 037 can also be connected to an evacuating pump, with the pneumatic motor being driven in opposite direction and the piston being moved downwards by means of reduced pressure.

As in the case of blowing in, for sucking out, the wheels 408, 409 can exert an additional force on the cable in the direction of travel of the cable.

We claim:

1. A method for removing a cable structure from a tube, using a cable lead-through apparatus which comprises a housing with an inlet opening, an outlet opening, and a pressure supply opening, said method comprising:

connecting in a substantially fluid-tight manner a first end of the tube, from which the cable structure is to be removed, to the inlet opening of said apparatus;

advancing an end of the cable structure that is nearest to the first end of the tube through the outlet opening of said apparatus by applying a negative fluid pressure through the pressure supply opening of said apparatus to the first end of the tube during a first period of time until the cable structure comes to a substantial standstill;

removing the negative fluid pressure from the pressure supply opening of said apparatus; and further advancing the cable structure towards and through the outlet opening of said apparatus by applying a positive fluid pressure to the pressure supply opening of said apparatus until substantially a whole length of the cable structure is removed from the tube.

2. The method according to claim 1, further comprising conveying the cable structure using a pair of driven pressure rollers during removal.

3. An apparatus for removing a cable structure from a tube using a moving fluid, said apparatus comprising:

a substantially air-tight housing having an inlet opening that can be connected to the tube from which the cable structure is to be removed;

an outlet opening provided on said housing opposite to the inlet opening;

a connector provided on said housing for connecting one of an evacuating pump and a compressor to said housing;

a guide partition provided alongside a path extending from the inlet opening to the outlet opening, between the connector and the path; and a guide disk mounted on the housing such that a tube forming part of a bundle of tubes can be placed over the guide disk.

4. The apparatus according to claim 3, wherein the housing is substantially cylindrical and comprises two shell halves which each form half a cylinder, and wherein a seal is provided between the two shell halves so that when the two shell halves are mounted together the housing is substantially air-tight.

5. The apparatus according to claim 4, wherein the guide disk forms part of one of the two shell halves.

6. An apparatus for removing a cable structure from a tube using a moving fluid, said apparatus comprising:

a substantially air-tight housing having an inlet opening that can be connected to the tube from which the cable structure is to be removed;

an outlet opening provided on said housing opposite to the inlet opening;

a connector provided on said housing for connecting at least one of an evacuating pump and a compressor to said housing;

at least one pair of opposite pressure wheels provided alongside a path extending from the inlet opening to the outlet opening, between the connector and the outlet opening, said pressure wheels being adapted to engage the cable structure so as to advance the cable structure towards the outlet opening; and a pneumatic piston for moving said pressure wheels towards each other.

7. The apparatus according to claim 6, further comprising a pneumatic switch, for coupling the pneumatic piston to one of the evacuating pump and the compressor, so that the piston may be energized by said one of the evacuating pump and the compressor.

8. The apparatus according to claim 6 or 7, further comprising a pneumatic motor for driving at least one of said pressure wheels so as to cause said pressure wheels to advance the cable structure towards the outlet opening, said pneumatic motor being coupled, for the driving thereof, to one of the evacuating pump and the compressor.

9. The apparatus according to claim 6 or 7, wherein at least two pairs of opposite pressure wheels are provided alongside the path extending from the inlet opening to the outlet opening, between the connector and the outlet opening, and wherein the apparatus further comprises a first pneumatic motor that can be coupled to the evacuating pump and a second pneumatic motor that can be coupled to the compressor, each of said first and second pneumatic motors being adapted to drive at least one wheel of said pairs of opposite pressure wheels.

10. An apparatus for installing cable structures in tubes and for removing cable structures from tubes using a moving fluid, said apparatus comprising:

a substantially air-tight housing having an inlet opening that can be connected to the tube from which the cable structure is to be removed;

an outlet opening provided on said housing opposite to the inlet opening;

a connector provided on said housing for connecting at least one of an evacuating pump and a compressor to said housing;

at least one pair of opposite pressure wheels provided alongside a path extending from the inlet opening to the outlet opening, between the connector and the outlet opening, said pressure wheels being adapted to engage the cable structure so as to advance the cable structure towards either one of the inlet opening and the outlet opening; and a pneumatic piston for moving said pressure wheels towards each other.

11. The apparatus according to claim 10, further comprising a pneumatic switch, for coupling the pneumatic piston to one of the evacuating pump and the compressor, so that the piston may be energized by said one of the evacuating pump and the compressor.

12. The apparatus according to claim 10 or 11, further comprising a pneumatic motor for driving at least one of said pressure wheels so as to cause said pressure wheels to advance the cable structure through the tube, said pneumatic motor being coupled, for the driving thereof, to one of the evacuating pump and the compressor.

13. The apparatus according to claim 10 or 11, wherein at least two pairs of opposite pressure wheels are provided alongside the path extending from the inlet opening to the outlet opening, between the connector and the outlet opening, and wherein the apparatus further comprises a first pneumatic motor that can be coupled to the evacuating pump and a second pneumatic motor that can be coupled to the compressor, each of said first and second pneumatic motors being adapted to drive at least one wheel of said pairs of opposite pressure wheels.

* * * * *